United States Patent
Dreier

[11] Patent Number: 6,089,850
[45] Date of Patent: Jul. 18, 2000

[54] MOLDING MACHINE

[75] Inventor: Horst Dreier, Horb/Neckar, Germany

[73] Assignee: Dreier Technology AG, Chur, Switzerland

[21] Appl. No.: 08/953,761

[22] Filed: Oct. 17, 1997

Related U.S. Application Data

[63] Continuation of application No. 08/646,545, May 8, 1996, abandoned.

[30]      Foreign Application Priority Data

Mar. 19, 1996 [DE] Germany ............................ 196 12 018

[51] Int. Cl.[7] ................................................. B29C 45/80
[52] U.S. Cl. ....................... 425/150; 425/450.1; 425/589; 264/40.5; 264/40.7
[58] Field of Search ........................ 100/258 A; 425/150, 425/589, 450.1; 264/40.5, 40.7

[56]            References Cited

U.S. PATENT DOCUMENTS

| | | | |
|---|---|---|---|
| 4,038,004 | 7/1977 | Hartmann | 425/150 |
| 4,131,596 | 12/1978 | Allen | 425/150 |
| 4,341,511 | 7/1982 | Laurent et al. | 425/150 |
| 5,540,577 | 7/1996 | Ishikawa et al. | 425/150 |
| 5,792,396 | 8/1998 | Takizawa | 425/150 |
| 5,800,750 | 9/1998 | Laing et al. | 425/150 |
| 5,820,797 | 10/1998 | Hehl | 425/150 |
| 5,863,475 | 1/1999 | Ueda | 425/150 |

FOREIGN PATENT DOCUMENTS 61-261017  11/1986  Japan ..................... 425/150

*Primary Examiner*—Robert Davis
*Assistant Examiner*—Thukhanh T. Nguyen
*Attorney, Agent, or Firm*—Jones, Tullar & Cooper, P.C.

[57]            ABSTRACT

A molding machine with a movable molding element and at least one stationary molding element and guides to guide the movable molding element relative to the at least one stationary molding element. At least two laser light beam generators are mounted on one of the stationary or movable molding elements, and at least two laser light beam reflectors are mounted on the other of the stationary or movable molding elements at similarly spaced locations in order to receive and reflect a laser beam generated by one of the laser light beam generators.

11 Claims, 3 Drawing Sheets

MOLDING MACHINE

This is a continuation-in-part of application Ser. No. 08/646,545 filed on May 8, 1996 and now abandoned.

BACKGROUND OF THE INVENTION

The present invention relates to a molding machine which has a molding element which can be moved along guides, as well as a molding element, which forms a counter-support and is stationary with respect to a machine frame, such as a press, a plastic extrusion machine or a pressure die casting machine.

Such machines are often very large and heavy so that several metal spars or columns extending parallel with respect to each other, and which extend through guide openings of the movable molding elements, are provided for guiding the movable and customarily metal molding element. The movable molding elements can be a die or tappet plate of a press, which can be moved toward and away from the stationary matrix-like molding element. The movable molding element can, however, be a component which can be called a closure plate, by means of which a stationary tool mold of a plastic extrusion machine or a pressure die casting machine can be closed in order to define the shape of the workpiece to be produced and to be able to perform an extrusion or pressure casting process.

Changes of the guide system always occur with molding machines of the type described which, as a rule, are all the greater the longer the dimensions of the guides or spars or the mass of the stationary or moving parts are. Bending and sagging of the guide or a change, in particular twisting or bending of the movable molding elements, can occur. This leads to tilting of the movable molding element with respect to the guide and can lead to the feared so-called "spar tears", even with otherwise sufficiently dimensioned guides or spars. When a spar breaks there is the immediate danger that the other spars will become overloaded and damaged or even also break. As a rule this leads to serious damage of the molded part which is expensive to produce. The results are high repair costs, expenses because of production losses and possibly penalties for breach of contract and even loss of the order. Even frequent new measurements and appropriate adjustments or setting of the guide system of the molding machine does not offer sufficient protection, since the changes often occur after only short running times and are a function of the individual operation of the molding machine, so that it is not possible with any assurance to predict at what time new measurements or adjustments are required.

SUMMARY OF THE INVENTION

It is therefore an object of the present invention to improve a molding machine of the type mentioned at the outset in such a way that the above mentioned disadvantages do not occur, i.e. damage to the molding machines in particular can be prevented.

This object is attained in accordance with the present invention in a molding machine of the type mentioned by means of a laser distance measuring device with at least one laser for generating at least two laser light beams which run back and forth between the areas of the machine whose distance from each other is to be measured, wherein the laser light beams originate in one of the areas and are reflected back by a reflector element on the other area, and with respectively one receiving device for the reflected beams.

Thus it is possible with the molding machine in accordance with the present invention to determine the distance between two areas of the molding machine at two positions which are spaced apart from each other and to subsequently compare them with each other. It is then possible to determine whether the two areas of the machine move away from each other or toward each other, or whether their distance changes in different ways along the two laser light beams.

For example, in accordance with an injection or pressure die casting tool it is possible to determine whether the tool remains closed during the injection process or whether it opens slightly under the enormous pressures. It is possible to detect and correct in time a spar extension or bending as well as a change in the shape of the movable molding elements.

For example, it is possible that the at least two laser light beams run between the movable molding element and the stationary molding element. The laser measuring device is in this case advantageously disposed in such a way that the laser light beams extend parallel with each other and emanate, for example, from a laser head disposed on the stationary molding element and are reflected back from a reflector element on the movable mold element. In this case each guide of the machine is preferably provided with a laser light beam. If the distance values obtained by means of the respective distance measurements by the individual laser light beams change in different ways during the opening or closing of the molding machine, this indicates a change in the geometry of the guide system, the spars or the movable molding element and thus the danger of spar tears or other damage to the molding machine.

It can furthermore be shown to be advantageous if at least two laser light beams run between two areas of the molding machine which are stationary with respect to the machine stand, so that a change in the machine stand, for example bending of the machine base, can be detected in this way.

In order to be also able to detect a parallel canting of stationary areas, in particular base and support plates or walls which, for example, support the spars, it has been shown to be advantageous that at least two laser light beams running between these areas extend diagonally at an angle from each other. With this arrangement the distance along the one laser light beam will increase and will decrease along the other in case of parallel canting of these areas.

It should be pointed out that the above described distance measurement can also be performed per se by employing any arbitrary laser source with the so-called Doppler method as well as with the interference method, both of which are known and therefore do not require any explanation.

The receiver device disposed in each laser light beam advantageously cooperates with an indicator device, by means of which information regarding the distance of the respective areas of the machine can be indicated. In this case the use of a digital indicator has been shown to be advantageous.

In the further development of the present invention, the provision of a data processing device cooperating with the processor circuit, in particular a PC, is of particular importance for processing the information regarding the distance of the two machines.

A comparison of the obtained distance values can be performed by means of the data processing device.

In a particularly advantageous embodiment of the present invention the data processing device itself cooperates with the control of the molding machine in such a way that if set limits are exceeded during the comparison of the distance information, the machine is stopped. In this way it is possible to assuredly prevent the damages mentioned at the outset.

In a still further embodiment of the present inventive concept, the data processing device cooperates with the control of the molding machine in such a way that when defined set limits have been exceeded during the comparison of the control information control functions are performed which lead to a drop below the set limits.

Further characteristic, details and advantages of the invention ensue from the attached drawing representation and subsequent description of an advantageous embodiment of the present invention.

DESCRIPTION OF THE PREFERRED EMBODIMENTS

Figure 1:
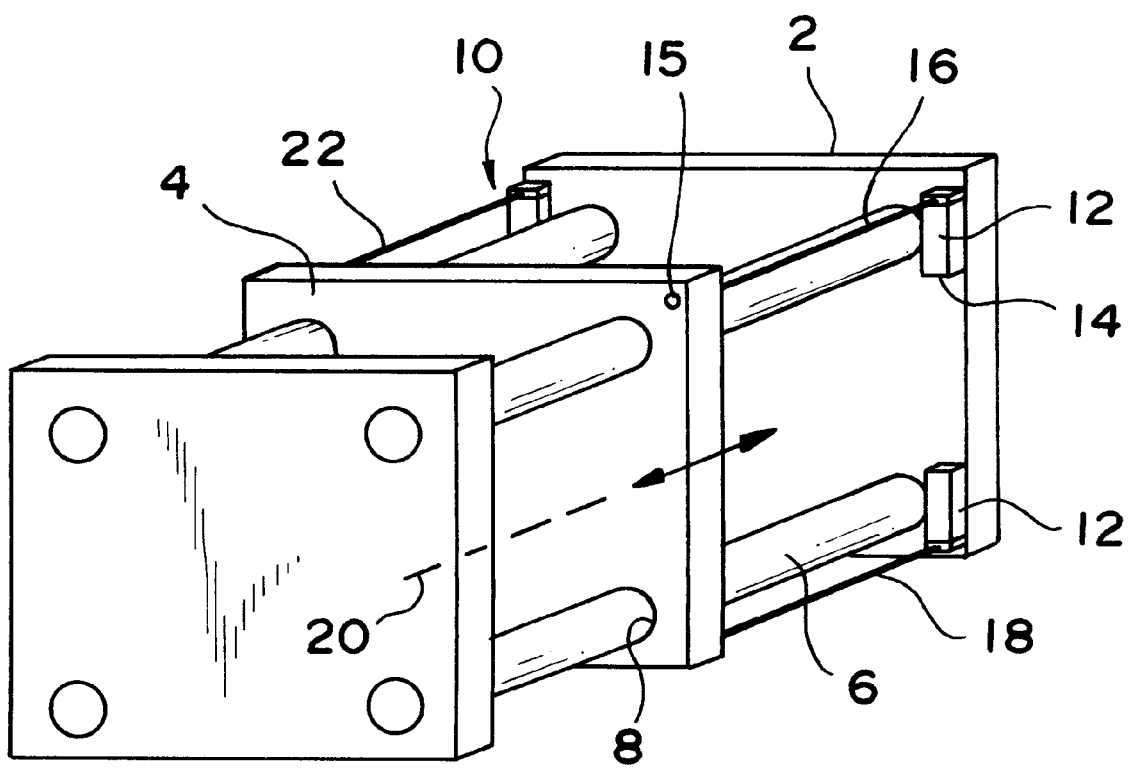
FIG. 1, is a schematic representation of a molding machine which in accordance with the present invention is embodied with a laser distance measuring device.

FIG. 1 shows a molding machine in a schematic representation, for example a pressure die casting machine with a stationary molding element 2 and a molding element 4 which is movable with respect to it, and which is supported and guided by four parallel guides 6 disposed at the corners of a square. The guides 6 are embodied in the form of horizontally extending spars or columns, which project through openings 8 in the movable molding element 4. A laser distance measuring device indicated by the reference numeral 10 includes four laser heads 12 which are respectively placed, in particular magnetically fixed, on a housing 14 on the stationary molding element. The laser heads 12 comprise a laser light source for generating a laser light beam 16, which extends parallel with the guides 6 in the direction toward the movable molding element 4 and is there reflected on itself by a reflector element 15 and is supplied inside the laser head 12 to a receiver device, not shown in the drawing figure. By comparing distance information obtained from different laser light beams 16, 18, 20, 22, irregularities, such as twisting or canting of the movable molding element 4, can be detected.

Figure 2A:
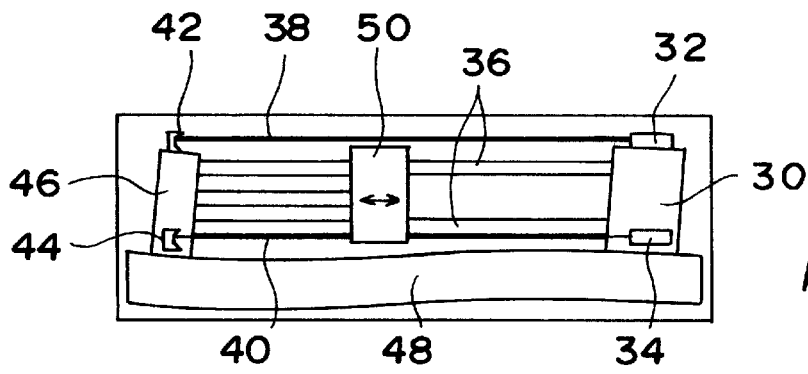
FIGS. 2A, B, and C, illustrate various possibilities of the arrangement of the distance measuring device.

FIGS. 2A, B and C represent different arrangements of the laser distance measuring device in schematic views. In FIG. 2A, two laser heads 32 and 34 disposed on a stationary machine area 30 are shown. These each respectively generate a laser light beam 38 and 40 extending parallel with the guides 36, which is reflected back on itself at a respective reflector element 42, 44 at another stationary machine area 46. The stationary machine areas 30, 46 are connected with the machine stand 48 and are therefore dependent on its dimensional stability. They support the spar-shaped guides 36 and thus the movable molding element 50.

By comparing the distance information obtained from the two laser light beams 38, 40 it is possible to detect changes in the machine stand.

Figure 2B:
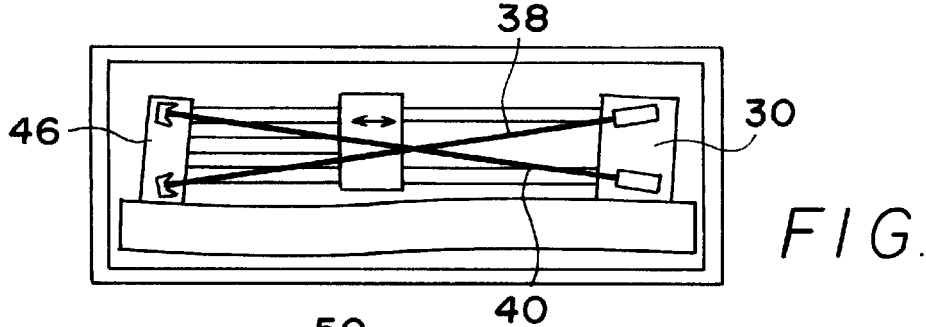

For the case where the stationary machine areas 30, 46, as represented in FIG. 2B, tilt parallel with each other, an arrangement is preferred in which the laser light beams 38, 40 extend diagonally at an angle to each other. The distance obtained from the laser light beam 38 increases in the course of tilting, while the distance obtained from the laser light beam 40 decreases.

Figure 2C:
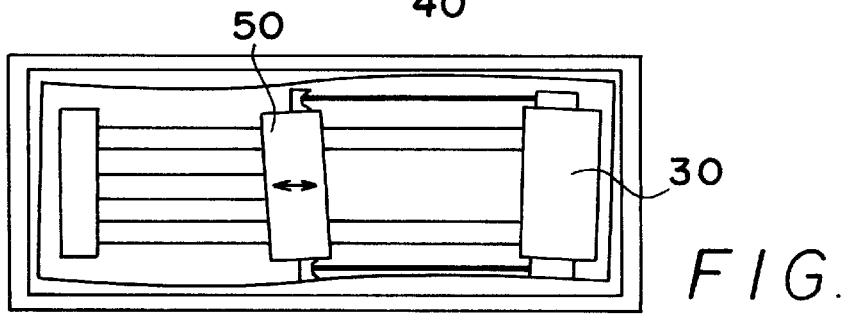

The arrangement represented in FIG. 2C corresponds to that in FIG. 1. By means of this it can be determined whether the movable molding element is moved exactly parallel with respect to the stationary molding element 30 or whether, as indicated in FIG. 2C, it tilts.

Figure 3A:
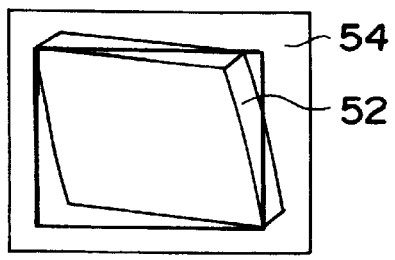
FIGS. 3A, and B, illustrate a change in the movable molding element as a whole or of itself.
Figure 3B:
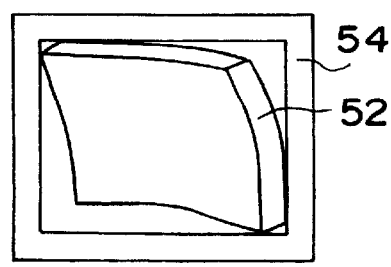

FIG. 3A explains only the tilting of a movable molding element 52 out of a plane indicated by the reference numeral 54. In the representation of FIG. 3B the molding element 52 is not only tilted, but additionally is bent on itself.

Figure 4:
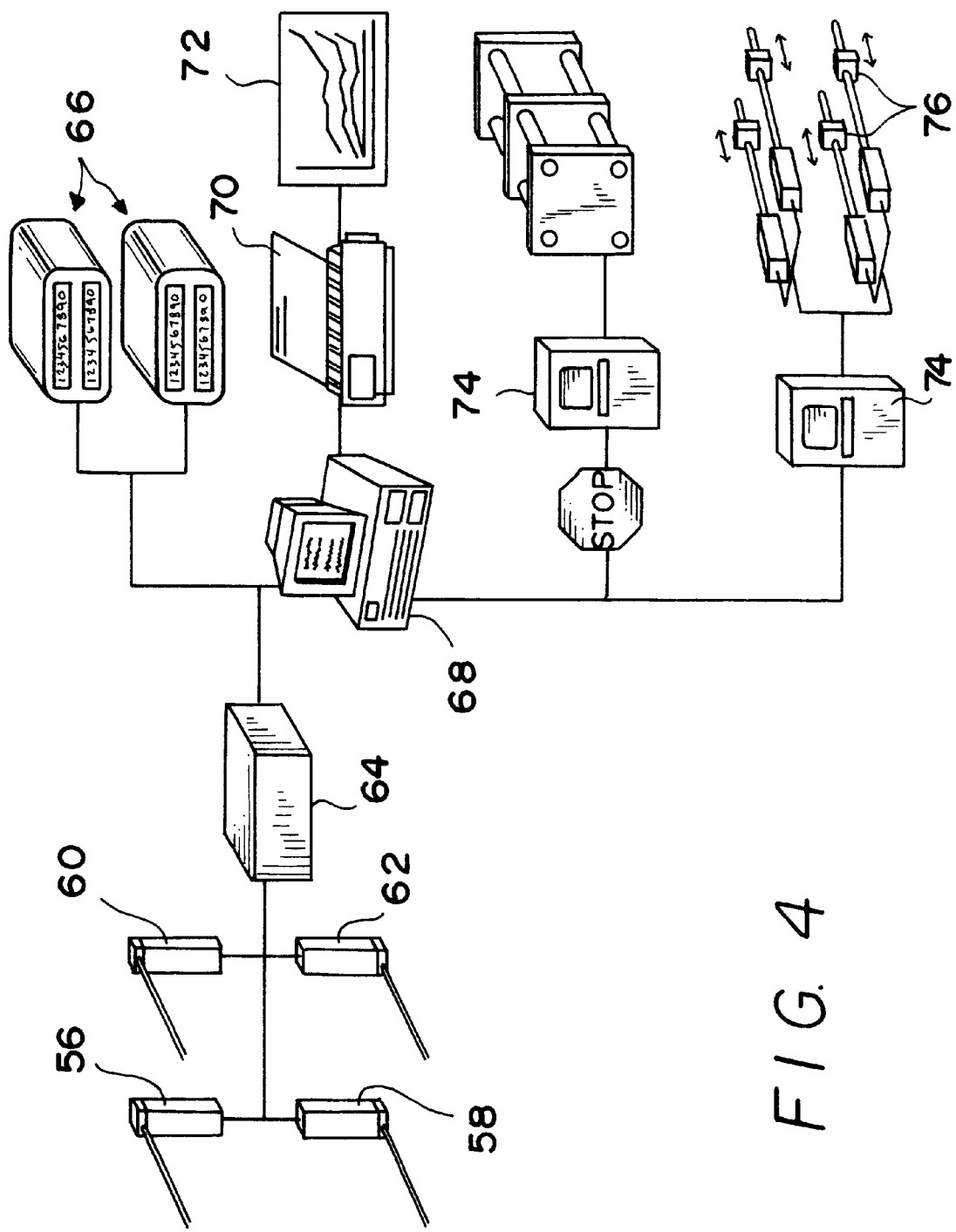
FIG. 4, represents a functional diagram in the course of the operation of a molding machine in accordance with the present invention.

Four laser heads 56, 58, 60, 62 are represented in the functional diagram in accordance with FIG. 4 which are assigned to spars, not shown, for example of a molding machine in accordance with FIG. 1. The receiver devices provided inside the laser heads for the reflected back laser light beams generate distance information which is supplied to a processor circuit 64. The processor circuit 64 is connected with the digital indicator device 66, where the distance information can be displayed. However, the distance information can also be supplied to a data processing device 68. It is then possible to produce a graphic representation 72 of the chronological sequence of the obtained distance information by means of a printer 70. However, it is also possible to perform a comparison of the different pieces of distance information in the data processing device 68, and when defined set limits are exceeded, the data processing device 68 cooperating with the control 74 of the molding machine can cause the immediate stopping of the molding machine in order to prevent damaging the molding machine.

However, it is also conceivable that the data processing device 68 is connected with the control 74 of the molding machine in such a way that the movement along individual shafts 76 can be adjusted in such a way that the detected excess past the set limit is canceled.

What is claimed is:

1. A molding machine, comprising: a machine stand; a movable molding element; two stationary molding elements mounted to said machine stand; guide means connecting said two stationary molding elements and said movable molding element for guiding said movable molding element relative to said stationary molding elements; means for generating at least two laser light beams each extending between said two stationary molding elements; and means for receiving and reflecting said at least two laser light beams.

2. The molding machine in accordance with claim 1, wherein said at least two laser light beams extend at an angle to each other.

3. The molding machine in accordance with claim 1, wherein said guide means includes a plurality of guides, and wherein a laser light beam is associated with each guide.

4. The molding machine in accordance with claim 1, wherein said means for receiving and reflecting said at least two laser light beams includes a receiver device which cooperates with an indicator device so that information regarding the distance between said two stationary molding elements can be displayed.

5. The molding machine in accordance with claim 4, further comprising: a processor circuit and a digital indicator device, wherein said means for receiving and reflecting said at least two laser light beams cooperates with said processor circuit, and said processor circuit cooperates with said digital indicator device.

6. The molding machine in accordance with claim 5, further comprising: a data processing device which cooperates with said processor circuit for processing the information regarding the distance between said two stationary molding elements.

7. The molding machine in accordance with claim 6, wherein a comparison of the obtained information can be performed by means of said data processing device.

8. The molding machine in accordance with claim 7, further comprising: machine control means for controlling the stopping of the molding machine, wherein said data processing device cooperates with said machine control means such that when defined set limits are exceeded during said comparison of the obtained information the molding machine is stopped.

9. The molding machine in accordance with claim 6, further comprising: machine control means for providing control functions relative to defined set limits, wherein said data processing device cooperates with said machine control means such that when the defined set limits are exceeded during comparison of distance information, control functions are performed which lead to a drop below the defined set limits.

10. The molding machine in accordance with claim 9, wherein said data processing device cooperates with said machine control means such that an adjustment can be performed during the operation of the machine.

11. The molding machine in accordance with claim 6, wherein said data processing device comprises a personal computer.

* * * * *